(12) United States Patent
Hedrick

(10) Patent No.: US 7,921,631 B2
(45) Date of Patent: Apr. 12, 2011

(54) METHOD OF RECOVERING ENERGY FROM A FLUID CATALYTIC CRACKING UNIT FOR OVERALL CARBON DIOXIDE REDUCTION

(75) Inventor: Brian W. Hedrick, Oregon, IL (US)

(73) Assignees: UOP LLC, Des Plaines, IL (US); BP Corporation North America Inc., Warrenville, IL (US)

(*) Notice: Subject to any disclaimer, the term of this patent is extended or adjusted under 35 U.S.C. 154(b) by 0 days.

(21) Appl. No.: 12/888,004

(22) Filed: Sep. 22, 2010

(65) Prior Publication Data
US 2011/0011094 A1 Jan. 20, 2011

Related U.S. Application Data

(62) Division of application No. 11/962,763, filed on Dec. 21, 2007, now Pat. No. 7,811,446.

(51) Int. Cl.
*B01J 8/00* (2006.01)
(52) U.S. Cl. .......... 60/39.01; 208/106; 208/113
(58) Field of Classification Search ............ 208/46, 208/106, 113–124; 60/39.01
See application file for complete search history.

(56) References Cited

U.S. PATENT DOCUMENTS

| | | |
|---|---|---|
| 2,888,395 A | 3/1954 | Henny |
| 2,758,979 A | 8/1956 | Guthrie |
| 2,905,622 A | 9/1959 | McCarthy |
| 2,985,584 A | 5/1961 | Rabo et al. |
| 3,012,962 A | 12/1961 | Dygert |
| 3,137,133 A | 6/1964 | Wilson et al. |
| 3,363,993 A | 1/1968 | Campbell |
| 3,401,124 A | 9/1968 | Goulden |
| 3,554,903 A | 1/1971 | Wilson |
| 3,726,791 A | 4/1973 | Kimberlin, Jr. et al. |
| 3,856,659 A | 12/1974 | Owen |
| 3,882,671 A | 5/1975 | Nebgen |
| 3,886,060 A | 5/1975 | Owen |

(Continued)

FOREIGN PATENT DOCUMENTS

BE 875 477 10/1979
(Continued)

OTHER PUBLICATIONS

J. Terrible, et al.; "Consider using hydrogen plants to cogenerate power needs"; Hydrocarbon Processing (International edition); vol. 78/No. 12; pp. 43-53; Dec. 1999.

(Continued)

*Primary Examiner* — Robert J Hill, Jr.
*Assistant Examiner* — Brian McCaig
(74) *Attorney, Agent, or Firm* — Brinks Hofer Gilson & Lione

(57) ABSTRACT

In at least one embodiment of the present invention, a method of recovering energy from a FCC unit having a reactor and a regenerator for overall $CO_2$ reduction is provided. The method comprises cooling syngas to a predetermined low temperature to define cooled syngas. A turbo-expander including a first compressor is provided. The turbo-expander train is configured to combust and expand gas to drive the first compressor. The cooled syngas is compressed with the first compressor to define compressed syngas. A first stream of gas comprising $CO_2$ and a second stream of gas comprising CO are separated from the compressed syngas. $O_2$ and the first and second streams of gas are introduced to the turbo-expander train. The first stream of gas is expanded and the second stream of gas is combusted and expanded with the $O_2$ to recover energy, driving the first compressor and producing the syngas.

8 Claims, 6 Drawing Sheets

U.S. PATENT DOCUMENTS

| | | | |
|---|---|---|---|
| 3,928,172 A | 12/1975 | Davis, Jr. et al. |
| 4,075,831 A | 2/1978 | McGann |
| 4,146,463 A | 3/1979 | Radford et al. |
| 4,158,680 A | 6/1979 | McGann |
| 4,272,402 A | 6/1981 | Mayes |
| 4,276,150 A | 6/1981 | McHenry, Jr. |
| 4,309,309 A | 1/1982 | Blanton, Jr. |
| 4,316,794 A | 2/1982 | Schoennagel |
| 4,338,788 A | 7/1982 | Fink |
| 4,388,218 A | 6/1983 | Rowe |
| 4,392,345 A | 7/1983 | Geary, Jr. |
| 4,399,651 A | 8/1983 | Geary, Jr. et al. |
| 4,422,925 A | 12/1983 | Williams et al. |
| 4,425,259 A | 1/1984 | Hettinger, Jr. et al. |
| 4,431,529 A | 2/1984 | Carson |
| 4,452,048 A | 6/1984 | Geary, Jr. et al. |
| 4,454,025 A | 6/1984 | Hettinger, Jr. |
| 4,539,303 A | 9/1985 | MacLean et al. |
| 4,542,114 A | 9/1985 | Hegarty |
| 4,744,883 A | 5/1988 | Hettinger, Jr. |
| 4,776,948 A | 10/1988 | Skraba |
| 4,888,103 A | 12/1989 | Herbst et al. |
| 4,904,372 A | 2/1990 | Goelzer |
| 4,927,348 A | 5/1990 | Avidan |
| 4,965,232 A | 10/1990 | Mauleon |
| 5,098,554 A | 3/1992 | Krishna et al. |
| 5,114,682 A | 5/1992 | Goelzer |
| 5,202,294 A | 4/1993 | Raterman |
| 5,451,313 A | 9/1995 | Wegerer et al. |
| 5,538,623 A | 7/1996 | Johnson et al. |
| 5,565,089 A | 10/1996 | Ramachandran et al. |
| 5,597,537 A | 1/1997 | Wegerer et al. |
| 5,800,697 A | 9/1998 | Lengemann |
| 6,048,451 A | 4/2000 | Huff, Jr. et al. |
| 6,110,356 A | 8/2000 | Hedrick et al. |
| 6,149,859 A | 11/2000 | Jahnke et al. |
| 6,324,895 B1 | 12/2001 | Chitnis et al. |
| 6,369,286 B1 | 4/2002 | O'Rear |
| 6,616,899 B1 | 9/2003 | Upson |
| 6,866,771 B2 | 3/2005 | Lomas et al. |
| 6,916,417 B2 | 7/2005 | Mayes, Jr. |
| 7,005,455 B2 | 2/2006 | Cnossen et al. |
| 7,622,033 B1 | 11/2009 | McGehee |
| 7,699,974 B2 | 4/2010 | Hedrick |
| 7,699,975 B2 | 4/2010 | Hedrick |
| 7,767,075 B2 | 8/2010 | Hedrick |
| 2002/0120017 A1 | 8/2002 | Bohn et al. |
| 2004/0120878 A1 | 6/2004 | Mayes, Jr. |
| 2005/0067322 A1 | 3/2005 | Xu |
| 2006/0021909 A1 | 2/2006 | Cerqueira |
| 2006/0116543 A1 | 6/2006 | Bellet et al. |
| 2006/0266048 A1 | 11/2006 | Bell et al. |
| 2007/0209367 A1 | 9/2007 | Bell et al. |
| 2008/0148735 A1 | 6/2008 | McGehee |
| 2008/0152549 A1 | 6/2008 | Towler et al. |
| 2008/0152552 A1 | 6/2008 | Hedrick et al. |
| 2008/0153689 A1 | 6/2008 | Towler et al. |
| 2009/0032439 A1 | 2/2009 | Couch et al. |
| 2009/0035191 A1 | 2/2009 | Couch et al. |
| 2009/0035193 A1 | 2/2009 | Zhu et al. |
| 2009/0158661 A1 | 6/2009 | Hedrick |
| 2009/0158662 A1 | 6/2009 | Towler |
| 2009/0163351 A1 | 6/2009 | Towler |
| 2010/0137458 A1 | 6/2010 | Erling |

FOREIGN PATENT DOCUMENTS

| | | |
|---|---|---|
| DE | 1 667 573 | 8/1967 |
| DE | 2021 787 | 11/1971 |
| DE | 36 35 269 A1 | 10/1985 |
| DE | 37 09 185 A1 | 3/1986 |
| EP | 0 083 462 | 7/1983 |
| EP | 0092065 | 10/1983 |
| EP | 0100531 | 2/1984 |
| EP | 0 113 380 A1 | 7/1984 |
| EP | 0 162 251 A1 | 11/1985 |
| EP | 0 322 274 A1 | 6/1989 |
| EP | 0 369 537 A1 | 5/1990 |
| EP | 0490453 | 6/1992 |
| EP | 0 629 685 A1 | 12/1994 |
| EP | 1 278 700 B1 | 1/2003 |
| EP | 1 935 966 A1 | 6/2008 |
| EP | 1 939 269 A1 | 7/2008 |
| EP | 2 022 838 A1 | 2/2009 |
| FR | 2 596 059 A1 | 9/1987 |
| FR | 2 796 932 | 2/2001 |
| GB | 711208 | 6/1954 |
| GB | 2 024 033 A | 1/1980 |
| GB | 2107205 | 4/1983 |
| GB | 2 197 390 A | 5/1988 |
| GB | 2 263 314 A | 7/1993 |
| JP | 59-52529 | 3/1984 |
| JP | 5-17162 | 2/1987 |
| JP | 62-32181 | 2/1987 |
| JP | 62-56919 | 3/1987 |
| JP | 5-320863 | 12/1993 |
| JP | 6-256239 | 9/1994 |
| WO | WO 85/04181 | 9/1985 |
| WO | WO 90/06352 | 6/1990 |
| WO | WO 96/39369 | 12/1996 |
| WO | WO 98/46700 | 10/1998 |
| WO | WO 99/11739 | 3/1999 |
| WO | WO 01/70909 A1 | 9/2001 |
| WO | WO 01/77010 A1 | 10/2001 |
| WO | WO 02/04347 A1 | 1/2002 |
| WO | WO 02/051966 A1 | 7/2002 |
| WO | WO 03/035591 A1 | 5/2003 |
| WO | WO 03/062142 A1 | 7/2003 |

OTHER PUBLICATIONS

D.W. Townsend, et al.; "Heat and Power Networks in Process Design—Criteria for Placement of Heat Engines and Heat Pumps in Process Networks"; AlChe Journal (vol. 29, No. 5); pp. 742-748; Sep. 1983.

D.L. Bonk, et al.: "An Evaluation of Gas Turbines for APFBC Power Plants"; Presented to the Powergen 2000 Conference.

D.L. Bonk, et al.; "First-Generation Circulating Pressurized Fluidized Bed (CPFB) Combustor Power System with Industrial Components"; U.S. Department of Energy (date unknown).

D.G. Tajbl: "UOP Fluid Catalytic Cracking Process"; Handbook of Petroleum Refining Process, R.A. Meyers, Ed.; New York: McGraw Hill 1986.

McCabe, W.L. et al., "Unit Operations in Chemical Engineering", $5^{th}$ Edition, McGraw-Hill (5 pages) (1993).

"Implications of Using 'Torch Oil'" accessed online at <http://www.catcracking.com/operations/Torch_Oil.shtm> on Sep. 30, 2009. (No additional bibliographic information available).

Office Action dated Jan. 28, 2009 issued in related U.S. Appl. No. 11/643,554.

Office Action dated Jul. 9, 2009 issued in related U.S. Appl. No. 11/643,554.

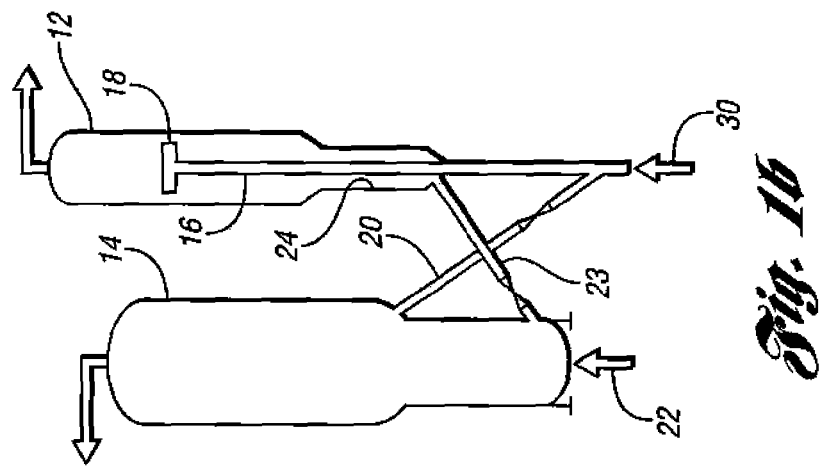
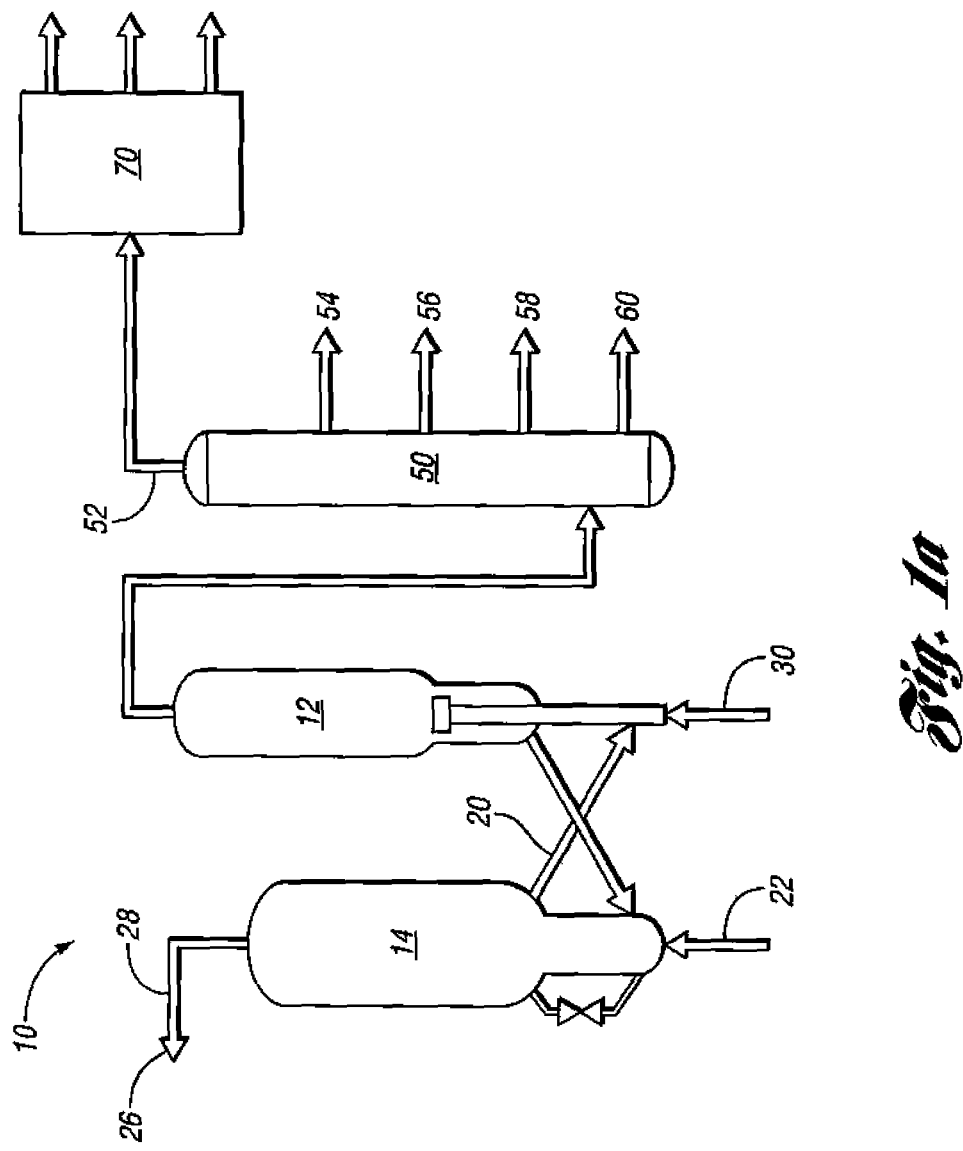

METHOD OF RECOVERING ENERGY FROM A FLUID CATALYTIC CRACKING UNIT FOR OVERALL CARBON DIOXIDE REDUCTION

CROSS-REFERENCE TO RELATED APPLICATION

This application is a Divisional of U.S. patent application Ser. No. 11/962,763, filed Dec. 21, 2007, now U.S. Pat. No. 7,811,446, entitled "METHOD OF RECOVERING ENERGY FROM A FLUID CATALYTIC CRACKING UNIT FOR OVERALL CARBON DIOXIDE REDUCTION," the entire contents of which are incorporated herein by reference.

THE NAMES OF THE PARTIES TO A JOINT RESEARCH AGREEMENT

This application is the result of a joint research agreement between UOP, LLC and BP America, Inc.

BACKGROUND OF THE INVENTION

The present invention relates to methods and systems of reducing carbon dioxide emissions in a fluid catalytic cracking unit.

The fluidized catalytic cracking of hydrocarbons is the mainstay process for the production of gasoline and light hydrocarbon products from heavy hydrocarbon charge stocks such as vacuum gas oils (VGO) or residual feeds. Large hydrocarbon molecules associated with the heavy hydrocarbon feed are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking (FCC) of hydrocarbons has been in existence since the early 1940's. The basic components of the FCC process include a reactor, a regenerator, and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium.

The FCC process is carried out by contacting the starting material—generally VGO, reduced crude, or another source of relatively high boiling hydrocarbons—with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. The cracking reaction deposits coke on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

Refining companies are under increased pressure to reduce carbon dioxide emissions as a result of carbon tax legislation and other drivers such as a desire to demonstrate long-term sustainability. Thus, there is a need to provide a way to reduce the carbon dioxide emissions of a fluid catalytic cracking unit and from the refinery plant in general.

One solution to reducing carbon dioxide emissions involves operating the FCC regenerator at gasification conditions and supplying the regenerator with a feed comprising recycled carbon dioxide and oxygen. In this scenario, carbon dioxide is reduced in part because the carbon dioxide is being recycled from a synthesis gas separator unit. One issue with this solution, however, is that under gasification conditions, the regenerator may not supply enough energy to the FCC process for cracking the hydrocarbon feedstock with the catalyst.

BRIEF SUMMARY OF THE INVENTION

Embodiments of the present invention generally provide methods and systems of recovering energy from a fluid catalytic cracking unit having a reactor and a regenerator for overall carbon dioxide reduction. The methods and systems of the present invention provide solutions to recovering energy from a fluid catalytic cracking unit which may be used to support the FCC process and/or to support other systems within the refinery which may lessen overall carbon dioxide emissions from the refinery.

In at least one embodiment of the present invention, a method of recovering energy from a fluid catalytic cracking unit having a reactor and a regenerator for overall carbon dioxide reduction is provided. The method comprises cooling syngas comprising carbon dioxide ($CO_2$), carbon monoxide (CO), water ($H_2O$), hydrogen sulfide ($H_2S$) and carbonyl sulfide (COS) to a predetermined low temperature to define cooled syngas. The syngas is produced by the regenerator at gasification conditions. A turbo-expander train including a first compressor is provided. The turbo-expander train is configured to combust and expand gas to drive the first compressor. The cooled syngas is compressed with the first compressor to a predetermined high pressure to define compressed syngas. A first stream of gas comprising $CO_2$ and a second stream of gas comprising CO are separated from the compressed syngas. Oxygen ($O_2$) and the first and second streams of gas are introduced to the turbo-expander train. The first stream of gas is expanded and the second stream of gas is combusted and expanded with the $O_2$ to recover energy, driving the first compressor and producing feed gas comprising $O_2$ and $CO_2$.

In one aspect of the present invention, the method further comprises the first compressor having a compression ratio between about 5:1 and 10:1. The second stream of gas comprising at least one of CO and $H_2$ and the feed gas comprises $O_2$ and at least one of $CO_2$ and $H_2O$. The feed gas is introduced into the regenerator having spent catalyst from the reactor. At gasification conditions, the regenerator burns coke from the spent catalyst, producing the syngas.

In at least one other embodiment of the present invention, a system for recovering energy from a fluid catalytic cracking unit having a reactor and a regenerator for overall carbon dioxide reduction is provided. The system comprises a cooling unit in fluid communication with the regenerator at gasification conditions. The regenerator produces syngas comprising $CO_2$, CO, $H_2O$, $H_2S$ and COS. The cooling unit is configured to cool the syngas to a predetermined low temperature to define cooled syngas. A turbo-expander train includes a first compressor in fluid communication with the cooling unit. The turbo-expander train is configured for receiving $O_2$, a first stream of gas comprising $CO_2$ and a second stream of gas comprising CO. The turbo-expander train is further configured for expanding the first stream of gas and combusting and expanding the second stream of gas with the $O_2$ to recover energy, driving the first compressor to compress the cooled syngas to a predetermined high pressure to define compressed syngas and producing feed gas comprising $O_2$ and $CO_2$. In fluid communication with the turbo-expander is a separator unit. The separator unit is configured to separate from the compressed syngas the first and second streams of gas.

Further objects, features and advantages of the invention will become apparent from consideration from the following description in the appended claims when taken in connection with the accompanying drawings.

BRIEF DESCRIPTION OF THE DRAWINGS

FIG. 1a is a schematic diagram of an example of a fluid catalytic cracking unit;

FIG. 1b is a schematic diagram of a reactor and a regenerator of the fluid catalytic cracking unit of FIG. 1a;

FIG. 2d is a schematic diagram of a fluid catalytic cracking unit in accordance with at least another embodiment of the present invention.

DETAILED DESCRIPTION OF THE INVENTION

Figure 2A:
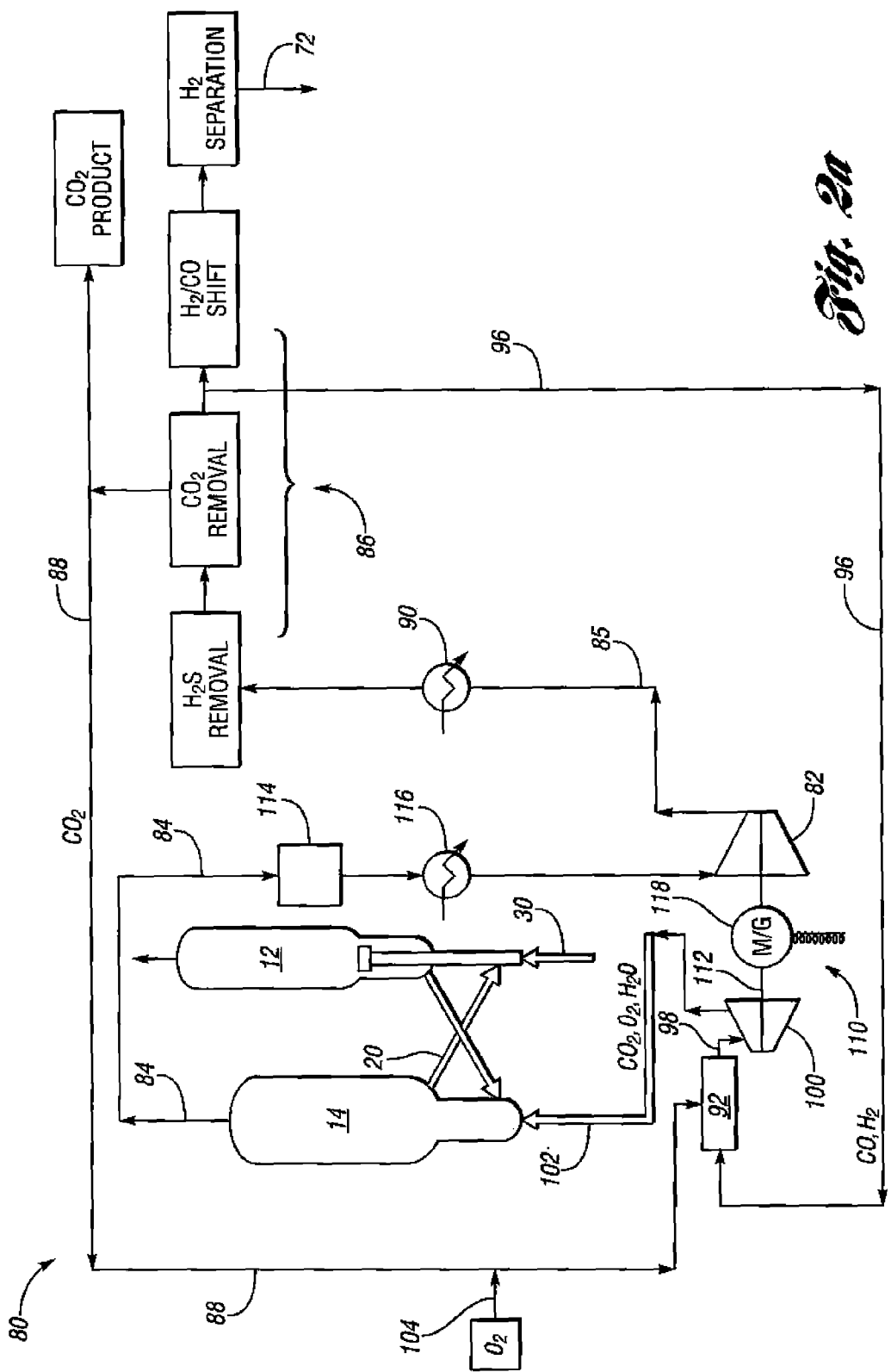
FIG. 2a is a schematic diagram of a fluid catalytic cracking unit in accordance with at least one embodiment of the present invention.

Detailed embodiments of the present invention are disclosed herein. It is understood however, that the disclosed embodiments are merely exemplary of the invention and may be embodied in various and alternative forms. The figures are not necessarily to scale; some figures may be configured to show the details of a particular component. Therefore, specific structural and functional details disclosed herein are not interpreted as limiting but merely as a representative basis with the claims and for teaching one skilled in the art to practice the present invention.

Examples of the present invention seek to overcome some of the concerns associated with heating a fluid catalytic cracking unit while reducing overall $CO_2$ emissions from the refinery. A conventional fluid catalytic cracking unit burns coke from the spent catalyst by feeding gas comprising air and/or $O_2$ into the regenerator, producing flue gas, which contains $CO_2$ but is typically rich in nitrogen ($N_2$). However, by introducing a feed gas comprising $O_2$ with $CO_2$ and/or $H_2O$ into the regenerator, a synthesis gas (syngas) may be produced. Specifically, the $CO_2$ and the $O_2$ in the feed gas may react with the carbon-hydrogen based coke to produce $CO_2$, CO, $H_2O$ and $H_2$ by a "dry" gasification process and the $H_2O$ and the $O_2$ in the feed gas may react with the coke to produce $CO_2$, CO and $H_2$ by a "wet" gasification process.

The $H_2$ in the syngas may be used as a raw material source for other operations within the refinery which may reduce the need for an additional fuel source, such as a hydrogen furnace. Additionally, the $CO_2$ in the syngas may be more easily sequestered than $CO_2$ in $N_2$ rich flue gas, such as for example, by limestone structures or any other suitable means known to those skilled in the art. By reducing or eliminating the need for a hydrogen furnace and by sequestering the $CO_2$ for recycling as a feed gas for operating the regenerator at gasification conditions, overall $CO_2$ emission may be reduced from the refinery.

However, burning coke on spent catalyst under gasification conditions is not as exothermic a process as burning coke in air and/or $O_2$. Moreover, the coke fuel is typically limited because only about 4%, for example, of a VGO feedstock fed to the reactor is converted to coke which is deposited upon the catalyst. Accordingly, less energy/heat is generated under gasification conditions and since the heat generated in the regenerator is used by the reactor for the cracking reaction, the reactor may be at a lower temperature which could adversely affect cracking of the hydrocarbon feedstock. Applicant has discovered that by separating the syngas into two gas streams, a first gas stream comprising $CO_2$ and a second gas stream comprising CO, various embodiments may be provided for recovering energy from each of the gas streams. The recovered energy may be used to support production of syngas processing and/or supplying the regenerator with a heated feed gas to provide more available heat for operating the reactor at reaction temperatures and/or generating electrical power and/or supporting other systems within the refinery with $H_2$ requirements.

Referring now to the drawings, FIG. 1a illustrates a fluid catalytic cracking (FCC) unit and separation system 10. As shown, the FCC unit 10 comprises a reactor 12 that is configured to receive a crude or hydrocarbon feedstock 30 (fresh feed) and a regenerator 14 in fluid communication with the reactor 12 to receive spent catalyst. The reactor 12 cracks the feedstock 30 therein to an effluent containing hydrocarbons ranging from methane through relatively high boiling point materials along with $H_2$ and $H_2S$. During the cracking reaction, a carbonaceous by-product is deposited on the circulating catalyst. This material, termed "coke," is continuously burned off the spent catalyst in the regenerator 14 as will be mentioned below.

The FCC unit 10 comprises the regenerator 14 for regenerating spent catalyst from the reactor 12. The regenerator 14 is configured to receive a feed gas 22 from an outside source and spent catalyst from the reactor 12. From the reactor 12, the spent catalyst has coke deposited thereon, reducing the activity of the catalyst. The regenerator 14 receives the feed gas 22 to burn the coke off the spent catalyst, thereby producing a flue gas 26 that exits a flue gas line 28 to a flue-gas system. The flue gas 26 may comprise CO, $CO_2$, $H_2O$ (steam), $SO_x$ and $N_2$, but it is typically very rich in $N_2$. The regenerator 14 is configured to rejuvenate or reactivate the spent catalyst by burning the deposited coke off the spent catalyst with the feed gas 22.

The regenerator 14 reactivates the catalyst so that, when returned to the reactor 12, the catalyst is in optimum condition to perform its cracking function. The regenerator 14 serves to gasify the coke from the catalyst particles and, at the same time, to impart sensible heat to the circulating catalyst. The energy carried by the hot regenerator catalyst is used to satisfy the thermal requirements for the reactor 12 of the FCC unit 10.

It is to be noted that the FCC unit 10 may have a number of optional units associated with the flue-gas system. In one embodiment, the flue gas 26 may comprise catalyst fines, $N_2$ from air used for combustion, products of coke combustions (e.g., oxides of carbon, sulfur, nitrogen, and water vapor), and trace quantities of other compounds. The flue gas 26 exits the regenerator 14 at a temperature of approximately 1325 degrees Fahrenheit (F), but may be as high as 1400 degrees F. or as low as 1200 degrees F., and at pressures of between about 20 and 50 pounds per square inch gauge (psig). The thermal and kinetic energy of the flue gas 26 can be converted to steam or used to drive a turbo-expander generator system for electrical power generation. Unconverted CO in the flue gas 26 can be combusted to $CO_2$ in a CO boiler with production of high-pressure steam. Catalyst fines may be removed by a solid removal unit, such as for example, an electrostatic precipitator. $CO_2$ from the regenerator and/or CO boiler is released to the atmosphere.

Referring now to FIGS. 1a to 1b, from the regenerator 14, hot regenerated catalyst is fed back to the reactor 12 via reactivated catalyst return line 20 and vaporizes the hydrocarbon feedstock 30 to define resultant vapors. The resultant vapors carry the catalyst upward through a riser 16 of the reactor 12 with a minimum of back mixing. At the top of the riser 16, desired cracking reactions have been completed and the catalyst is quickly separated from the hydrocarbon vapors to minimize secondary reactions. The catalyst-hydrocarbon mixture from the riser 16 is discharged into the reactor 12 vessel through a separation device 18, e.g., a riser termination device, achieving a substantial degree of catalyst-gas separation, e.g., at least 90 weight percent product vapor separation from catalyst. A final separation of catalyst and product vapor may be accomplished by cyclone separation.

The reactor effluent is directed to a main fractionator or fractionation column 50 of the unit 10 for resolution into gaseous light olefin co-products, FCC gasoline, and cycle stocks. The spent catalyst drops from within the reactor 12 vessel into a stripping section 24 thereof, where a countercurrent flow of steam removes interstitial and some adsorbed hydrocarbon vapors, defining stripped spent catalyst. Stripped spent catalyst descends through a first standpipe 23 and into the regenerator 14.

To maintain the activity of the working-catalyst inventory at a desired level and to make-up for any catalyst lost from the system with the flue gas 26, fresh catalyst may be introduced into the circulating-catalyst system by any suitable manner. For example, this may be accomplished by way of a catalyst storage hopper (not shown). Moreover, an additional storage hopper (not shown) may be used to hold spent catalyst withdrawn from the circulating system as necessary to maintain the desired working activity and to hold all catalyst inventory when the FCC unit 10 is shut down for maintenance and repairs.

As shown in FIGS. 1a and 1b, in the operation of the FCC unit 10, fresh feedstock 30 and (depending on product-distribution objectives) recycled cycle oils are introduced into the bottom of the riser 16 together with a controlled amount of regenerated catalyst. The charge may be preheated, either by heat exchange or, for some applications, by means of a fired heater.

Feedstocks 30 for the FCC process include mixtures of hydrocarbons of various types, including relatively small molecules such as found in gasoline to large molecules of 60 or more carbon atoms. The feedstock 30 may include a relatively small content of contaminant materials such as organic sulfur, nitrogen compounds, and organometallic compounds. It is to be noted that the relative proportions of all such materials will vary with the geographic origin of the crude and the particular boiling range of the FCC feedstock 30. However, the feedstocks 30 may be ranked in terms of their "crackabilities," or the ease with which they can be converted in an FCC unit. Crackability may be defined by a function of the relative proportions of paraffinic, naphthenic, and aromatic species in the feed.

The FCC unit 10 further includes a main-fractionation column 50 through which the reactor effluent is separated into various products. The main-fractionation comprises an overhead line 52, a first side cut line 54, a second side line 56, a third side cut line 58, and a bottom line 60. As shown, the overhead line 52 includes gasoline and lighter material, the first side cut line 54 includes naphtha, the second side cut line 56 includes light cycle oil, the third side cut line 58 includes heavy cycle oil, and the bottom line 60 includes slurry oil. The lines may include other products without falling beyond the scope or spirit of the present invention.

Reactor-product vapors are directed to the main fractionator 50 at which gasoline and gaseous olefin-rich co-products are taken overhead and routed to a gas-concentration unit 70. At the main-fractionator 50, light-cycle oil is recovered as a side cut with the net yield of this material being stripped for removal of light ends and sent to storage. Net column bottoms are yielded as slurry or clarified oil. Because of the high efficiency of the catalyst-hydrocarbon separation system utilized in the reactor design, catalyst carry-over to the fractionator 50 is minimized and it is not necessary to clarify the net heavy product yielded from the bottom of the fractionator 50 unless the material is to be used in some specific application requiring low solids content such as the production of carbon black. In some instances, heavy material can be recycled to the reactor riser 16.

Maximum usage is made of the heat available at the main column 50. Typically, light-cycle and heavy-cycle oils are utilized in the gas-concentration section 70 for heat-exchange purposes, and steam is generated by circulating main-column bottoms stream.

The gas-concentration column 70 is in fluid communication with overhead line of the main-fractionation column 50. From the overhead line 52, the gas-concentration column 50 receives unstable gasoline and lighter products that are separated therethrough into fuel gas for alkylation, polymerization, and debutanized gasoline.

The gas-concentration section 70 may be one or an assembly of absorbers and fractionators that separate the main-column overhead into gasoline and other desired light products. Olefinic gases from other processes such as coking may be also sent to the FCC gas-concentration section. The gas-concentration unit may have one or a plurality of columns. For example, the gas-concentration unit may be a "four-column" gas-concentration plant comprising a primary absorber, a secondary absorber, a stripper, and a debutanizer.

Referring now to FIGS. 2a-2d, at least one embodiment of a system 80 for recovering energy from a fluid catalytic cracking unit having a reactor 12 and a regenerator 14 for overall $CO_2$ reduction is provided. The system 80 comprises a cooling unit 116 that is in fluid communication with the regenerator 14 at gasification conditions. The regenerator produces syngas 84 that comprises $CO_2$, CO, $H_2O$ (steam), $H_2S$ and COS. The syngas 84 may also further include $H_2$. The cooling unit 116 is configured to cool the syngas 84 to a predetermined low temperature to define cooled syngas. In one example, the cooling unit 116 cools the syngas 84 from a temperature between about 1200 and 1850 degrees F. to a temperature between about 200 and 600 degrees F. The cooling unit 116 may be, for example, a boiler that extracts energy from the cooling syngas 84 to produce steam. Moreover, by cooling the syngas 84 preferably between a temperature of about 200 and 400 degrees F. or even lower, the $H_2O$ in the syngas 84 may be condensed within the syngas 84, which may facilitate subsequent processing of compressing the syngas 84.

A turbo-expander train 110 includes a first compressor 82. The first compressor 82 is in fluid communication with the cooling unit 116. The compressor 82 is for compressing the cooled syngas 84 at an inlet pressure to a predetermined high pressure to define a compressed syngas 85. In one example, the compressor 82 has a compression ratio between about 5:1 and 10:1 and preferably has a compression ratio of about 7:1. The inlet pressure may be, for example, between about 25 and 35 psig. The first compressor 82 preferably compresses the cooled syngas 84 to a pressure between about 150 and 500 psig.

Moreover, in the example where the syngas 84 is cooled to a temperature that condenses the $H_2O$ in the syngas 84, compression of the cooled syngas 84 is facilitated because the cooled syngas 84 volume is reduced which therefore reduces the horsepower required by the first compressor 82 for compression. Also, the steam that may be generated by the cooling unit/boiler 116 may be used to recover energy, for example, by a steam turbine (not shown) which may or may not be operatively coupled to the turbo-expander train 110. In the scenario where the steam turbine is operatively coupled to the turbo-expander train, the steam turbine helps drive the first compressor 82.

A separator unit 86 is in fluid communication with the first compressor 82 and is configured to separate from the compressed syngas 85, a first stream of gas 88 comprising $CO_2$ and a second stream of gas 96 comprising CO. In one example, the first stream of gas 88 contains substantially only $CO_2$ and the second stream of gas 96 may contain substantially only CO or at least one of CO and $H_2$. The separator unit 86 may include several other sub-units for separating. In one example, the separate unit 86 is further configured to separate $H_2S$ from the compressed syngas 85 prior to the separator unit 86 producing the first and second streams of gas 88 and 96. In this scenario, the separator unit may use a wet gas scrubbing process such as amine absorption, Rectisol™, or Selexol™, which is used to remove $H_2S$, COS, and the $CO_2$ from the compressed syngas 85 to form the first and second streams of gas 88 and 96. The syngas gas 85 may also contain CO and $H_2$, which can be mixed with steam and sent to a water-gas shift reactor to convert CO to $CO_2$, thus producing additional $H_2$. The $H_2$ may be further separated from the $CO_2$ via a process known as pressure swing adsorption. In this scenario, the separated $H_2$ 72 may minimize the need to burn hydrocarbon fuels elsewhere in the plant for use by another system, thereby reducing overall $CO_2$ emissions from the refinery. For example, the separated $H_2$ 72 may be used by another system by being burned as a fuel or used to hydro-treat or hydrocrack other hydrocarbons. Other suitable units or systems for separating known to those skilled in the art may also be used.

Heat recovery and cooling by a cooling unit 90 may be performed subsequent to compressing the syngas 84 by the compressor 82 but prior to the compressed syngas 85 being processed by the separation unit 86. In one example, the cooling unit 90 cools the compressed syngas 85 from a temperature between about 600 and 800 degrees F. to between about 300 and 500 degrees F.

The turbo-expander train 110 may further include a first expander 100, a shaft 112, and a combustion zone 92. The shaft 112 is operatively coupled to both the first expander 100 and the first compressor 82 such that the first expander 100 rotates the shaft 112 which drives the first compressor 82. The combustion zone 92 is in fluid communication with the first expander 100.

The combustion zone 92 is configured to receive the second stream of gas 96 and a stream of $O_2$ 104 to produce heated gas. In one embodiment and as illustrated in FIGS. 2c and 2d, the combustion zone 92 may receive the second stream of gas 96 and the $O_2$ 104 directly. Alternatively and as illustrated in FIGS. 2a and 2d, the $O_2$ 104 may be combined with the first stream of gas 104 and/or may be further compressed by a second compressor 96 of the turbo-expander train 110 prior to being received by the combustion zone 92. The second compressor 96 in this scenario is operatively coupled to the shaft 112 and may also be driven by the first expander 100.

The combustion zone 92 is configured for combusting the second stream of gas 96 with the $O_2$ 104 to a predetermined high temperature to produce heated gas 98. In one example, the predetermined high temperature is between about 1800 and 2100 degrees F. The combustion zone 92 combusts the CO and any $H_2$ (if present) from the second stream of gas 96 with the $O_2$ 104 to produce the heated gas 98 comprising $CO_2$ and/or $H_2O$. Moreover, some of the $O_2$ may remain un-reacted, especially if the $O_2$ is stoichiometrically in excess to the second stream 96. In this scenario, the excess $O_2$ also forms a portion of the heated gas 98.

The first expander 100 is configured to extract energy from the heated gas 98 by expanding the heated gas 98 to a predetermined low pressure, producing a feed gas 102 for the regenerator 14. In one example, the feed gas 102 comprises $O_2$ and $CO_2$ and may also contain $H_2O$. The feed gas 102 preferably has a pressure between about 30 and 70 psig and a temperature between about 1200 and 2100 degrees F. The first expander also uses the extracted energy to rotate the shaft 112. In one embodiment, the expander 100 is a 10 to 15 stage turbo-expander.

The feed gas 102 may then be introduced into the regenerator 14. The regenerator 14 is operating at gasification conditions to burn coke from spent catalyst from the reactor 12 to produce the syngas 84. The hotter the feed gas 102, the greater the total heat available (THA) in the regenerator 14 which is then used by the reactor 12 for cracking the feedstock 30 at reaction temperatures. In the scenario where the feed gas 102 has a temperature between about 1200° F. and 2100° F., the $O_2$ level in the feed gas 102 may be proportioned correspondingly to the level of coke deposited on the spent catalyst to provide the reactor with at least about 600 BTU per pound of feedstock 30. For example, the lower the coke content on the spent catalyst, the higher the proportion of $O_2$ in the feed gas 102 and vice versa. The at least about 600 BTU per pound of feedstock may provide the reactor 12 with enough heat to operate at reaction temperatures for cracking the feedstock 30.

In one embodiment, the first stream of gas 88 has a temperature of about at least 90 degrees F. and a pressure of at least about 100 psig and preferably at least about 180 psig. Accordingly, the first stream of gas 88, being highly compressed, has significant stored energy. The turbo-expander train 110 has several embodiments that extract energy from the first stream of gas 88 by expanding the gas 88. As illustrated in FIG. 2a, the first stream of gas 88 may be combined with the stream of $O_2$ 104 and fed to the combustion zone 92 with the second stream of gas 96. The first stream of gas 88 thereby becomes further heated by the combustion of the second stream of gas 96 with the $O_2$ and becomes part of the heated gas 98. As should be noted, the first stream of gas 88, being comprised substantially of $CO_2$, does not combust with the $O_2$ in the combustion zone 92. The expander 100, as discussed in the foregoing paragraphs, extracts energy by expanding the heated gas 98, which in this example includes the heated first stream of gas 88.

Alternatively and as illustrated in FIG. 2c, the first stream of gas 88 may be combined with the heated gas 98 and then fed to the first expander which extracts energy by expanding both the heated gas 98 and the first stream of gas 88. Once expanded, the first stream of gas 88 makes up a portion of the feed gas 102.

Figure 2B:
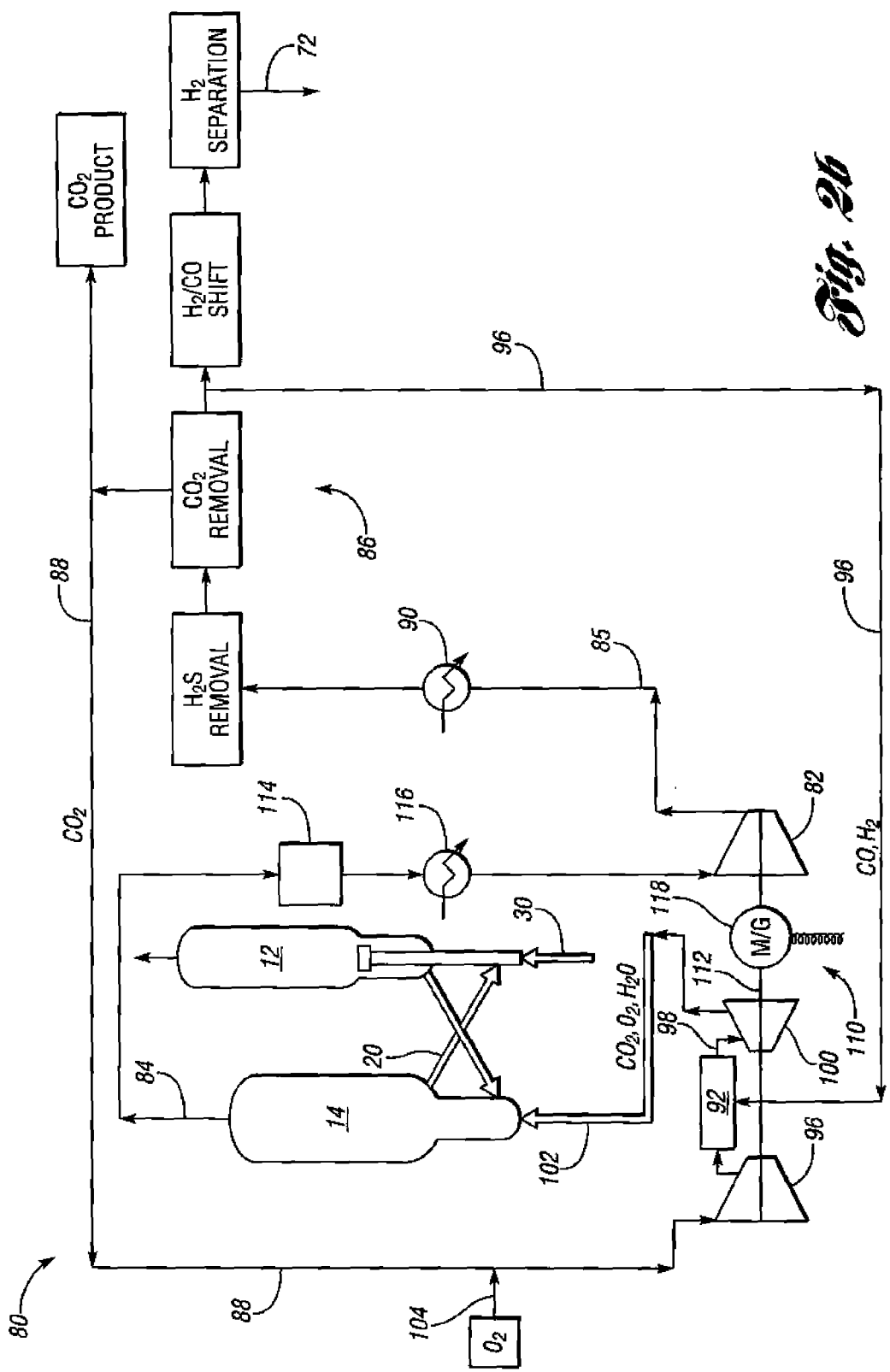
FIG. 2b is a schematic diagram of a fluid catalytic cracking unit in accordance with at least another embodiment of the present invention.
Figure 2C:
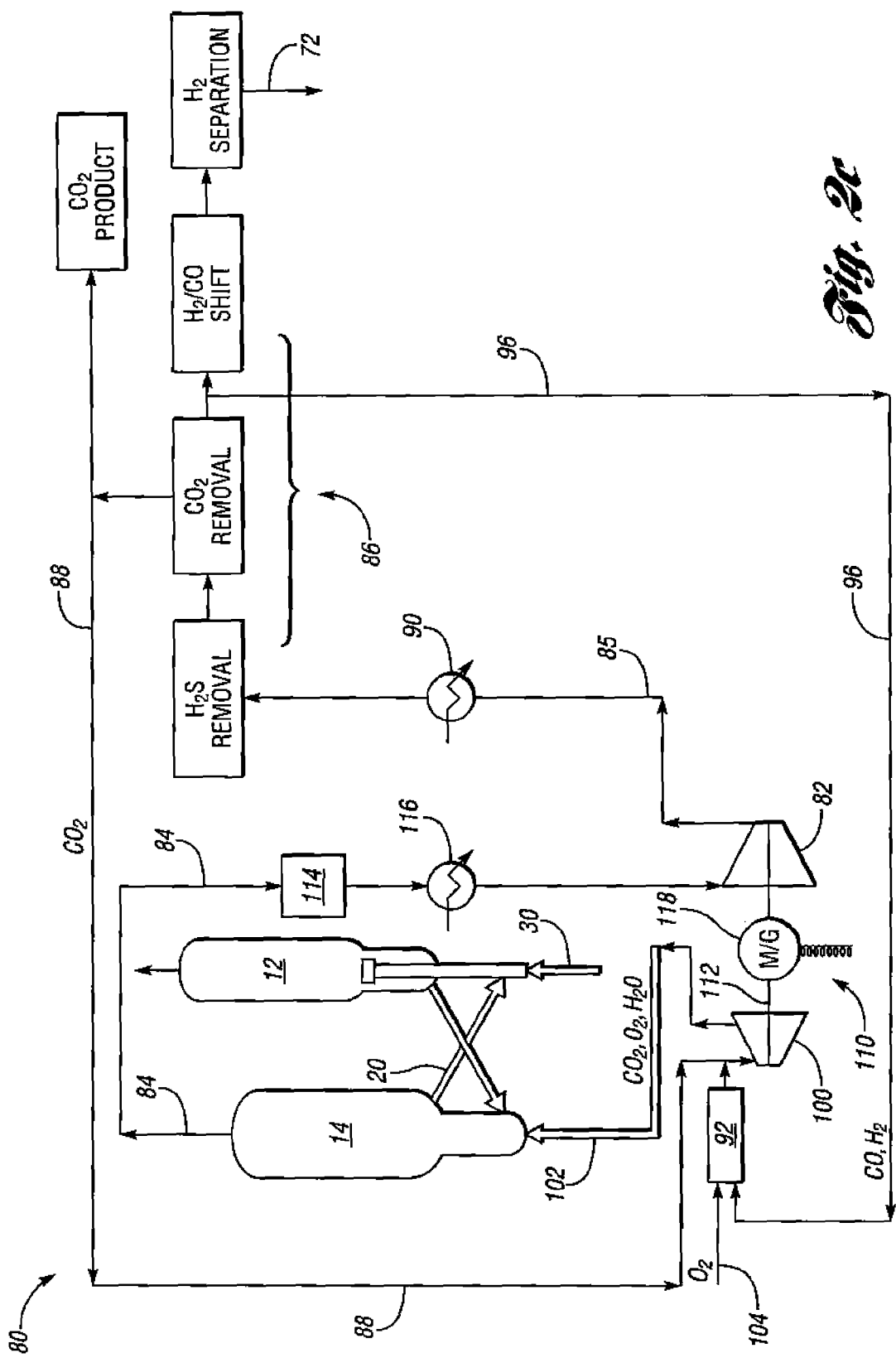
FIG. 2c is a schematic diagram of a fluid catalytic cracking unit in accordance with at least another embodiment of the present invention.
Figure 2B:
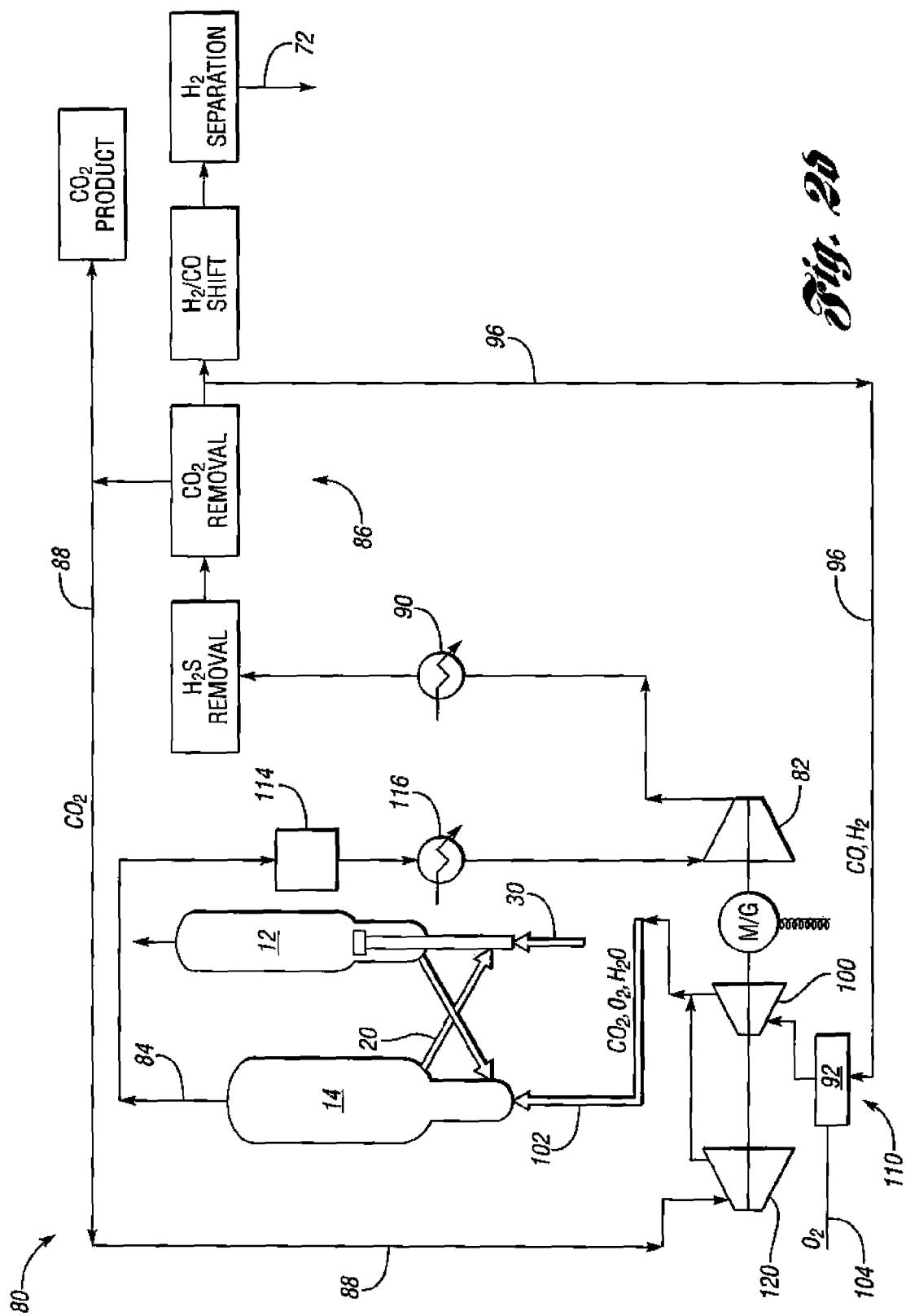

In yet another embodiment and as illustrated in FIG. 2b, the first stream of gas 88 may be further compressed by the second compressor 94 and then fed to the combustion zone 92 with the second stream of gas 96 and the $O_2$ 104. The first stream of gas 88, now being heated, makes up a portion of the heated gas 98.

In still yet another embodiment and as illustrated in 2d, the turbo-expander train 110 may further include a second expander 120 operatively coupled to the shaft 112 such that the first and second expanders 100 and 120 cooperatively rotate the shaft 112. The first stream of gas 88 may be fed to the second expander 120 which extracts energy by expanding the first stream of gas 88. The second expander 120 uses the extracted energy to rotate the shaft 112. The expanded first stream of gas 88 may then be combined with the feed gas 102 stream exiting the first expander 100, forming a portion of the feed gas 102 received by the regenerator 14.

The system 80 may include a solid removal unit 114. The cooling unit 116 is in fluid communication with the solid removal unit 114 and the first compressor 82. The solid removal unit 114 is in fluid communication with the regenerator 14 and may be used to remove catalyst fines from the syngas 84 prior to the syngas 84 being received by the cooling unit 116 and/or the compressor 82.

In at least one other embodiment, the turbo-expander train 110 further includes a motor generator 118. The motor generator 118 is operably coupled to the shaft 112 and may be driven by the expander 100 or may be used to assist rotation of the shaft 112. In one example, the motor generator 118 produces electrical power when the shaft 112 is rotated. The electrical power may be used for various processes within the plant. The generated electrical power minimizes the need to burn fuel elsewhere in the plant for power, thereby reducing overall $CO_2$ emissions from the plant.

Figure 3:
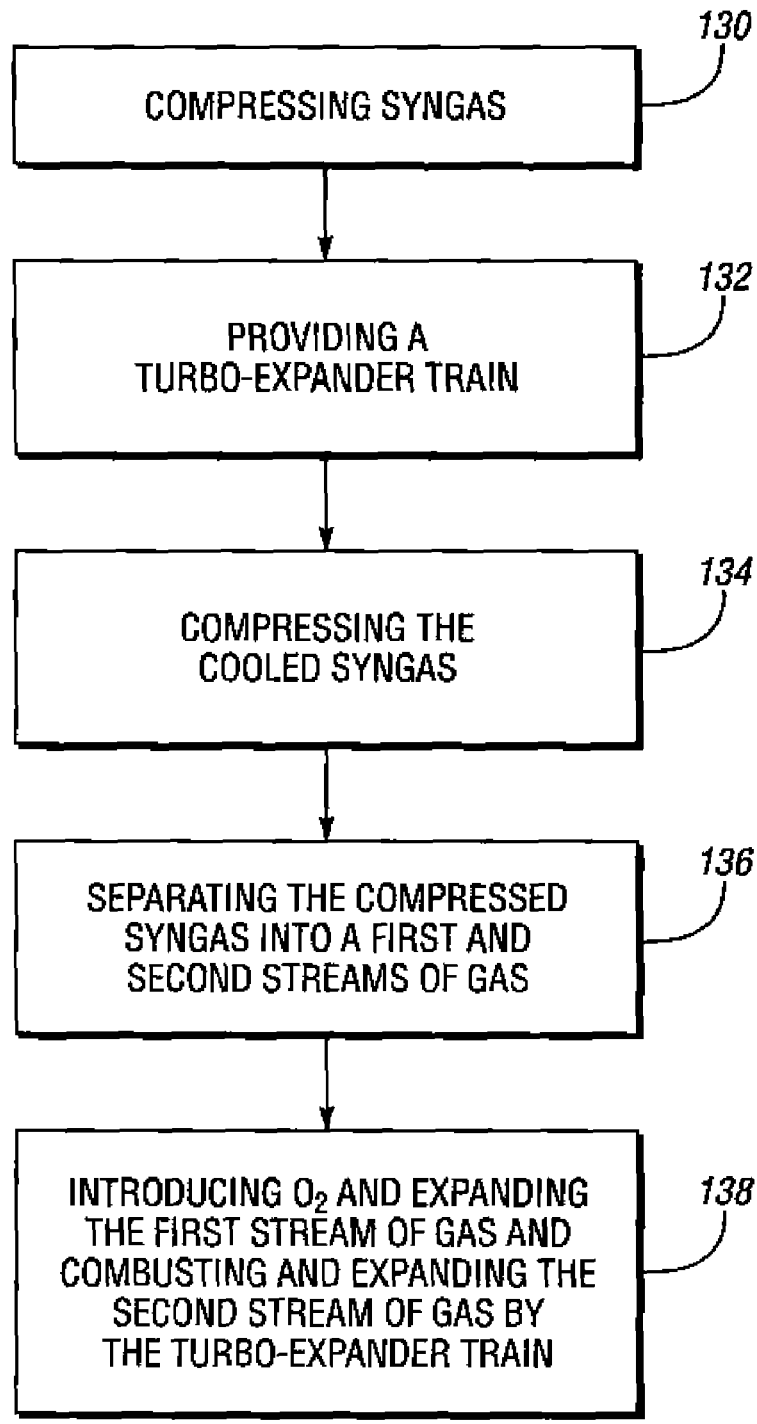
FIG. 3 is a flow chart of an example of a method for recovering energy from a fluid catalytic cracking unit for overall $CO_2$ reduction in accordance with the present invention.

Referring to FIG. 3, a method for recovering energy from a fluid catalytic cracking unit having a reactor and a regenerator with reduced $CO_2$ emissions is provided. The method comprises cooling syngas 130 to a predetermined low temperature to define cooled syngas. The syngas is produced by the regenerator at gasification conditions. In one example, the cooled syngas has a temperature between about 200 and 600 degrees F.

A turbo-expander train is provided 132. The turbo-expander train includes a first compressor. The turbo-expander train is configured to combust and expand gas streams to drive the first compressor.

The cooled syngas is compressed 134 with the first compressor to a predetermined high pressure to define compressed syngas. In one example, the cooled syngas is at an inlet pressure between about 25 and 35 psig and the predetermined high pressure is between about 150 and 500 psig.

A first stream of gas comprising $CO_2$ and a second stream of gas comprising CO are separated from the compressed syngas 136. The second stream of gas may also contain $H_2$.

$O_2$ and the first and second streams of gas are introduced to the turbo-expander train 138. The turbo-expander train expands the first stream of gas and combusts and expands the second stream of gas with the $O_2$ to recover energy, driving the first compressor and producing feed gas.

As a person skilled in the art will readily appreciate, the above description is meant as an illustration of the implementation of the principles of the invention. This description is not intended to limit the scope or application of this invention in that the invention is susceptible to modification, variation and change without departing from the spirit of this invention, as defined in the following claims.

What is claimed is:

1. A system for recovering energy from a fluid catalytic cracking unit having a reactor and a regenerator for overall carbon dioxide reduction, the system comprising:
a cooling unit in fluid communication with the regenerator at gasification conditions, the regenerator producing syngas comprising $CO_2$, CO, $H_2O$, $H_2S$ and COS and the cooling unit configured to cool the syngas to a predetermined low temperature to define cooled syngas; a turbo-expander train including a first compressor in fluid communication with the cooling unit, a first expander for expanding a first stream of gas comprising $CO_2$ a combustion zone for receiving $O_2$, the expanded first stream of gas comprising $CO_2$, and a second stream of gas comprising CO and for combusting the $O_2$ and the second stream of gas, a second expander for the expanding the first stream of gas and the combustion product of the second stream of gas with the $O_2$ to recover energy, a shaft for driving the first compressor to compress the cooled syngas to a predetermined high pressure to define compressed syngas and for producing feed gas comprising $O_2$ and $CO_2$; and a separator unit in fluid communication with the turbo-expander train and configured to separate from the compressed syngas the first and second streams of gas.

2. The system according to claim 1 wherein the turbo-expander train further includes a first expander, a shaft operatively coupled to both the first expander and the first compressor such that the first expander rotates the shaft which drives the first compressor, and a combustion zone in fluid communication with the first expander, the combustion zone configured to receive the second stream of gas with $O_2$ to produce heated gas, and the first expander configured to extract energy from the heated gas, producing at least a portion of the feed gas and driving the first expander to rotate the shaft.

3. The system according to claim 2 wherein the first expander is further configured to receive the first stream of gas with the heated gas and extract energy from the first stream of gas, producing at least a portion of the feed gas and driving the first expander to rotate the shaft.

4. The system according to claim 2 wherein the turbo-expander train further includes a second expander operatively coupled to the shaft such that the first and second expanders cooperatively rotate the shaft, the second expander configured to receive the first stream of gas, extracting energy from the first stream of gas, producing at least a portion of the feed gas and driving the second expander to rotate the shaft.

5. The system according to claim 2 wherein the turbo-expander train further includes a second compressor in fluid communication with the combustion zone and operatively coupled to the shaft such that rotation of the shaft drives the second compressor, the second compressor configured to receive the first stream of gas with the $O_2$ and to compress the first stream of gas and the $O_2$.

6. The system according to claim 2 wherein the turbo-expander train further includes a motor generator operatively coupled to the shaft such that rotation of the shaft drives the motor generator, producing electrical energy.

7. The system according to claim 1 wherein the syngas further comprises $H_2$ and the separator unit is configured to separate at least a portion of the $H_2$ from the compressed syngas, the portion of the $H_2$ being used for another system, reducing overall $CO_2$ emissions.

8. The system according to claim 1 wherein the regenerator has spent catalyst from the reactor and is configured for receiving the feed gas and to burn coke from the spent catalyst, producing the syngas.

* * * * *